United States Patent [19]
McFadden

[11] Patent Number: 5,448,925
[45] Date of Patent: Sep. 12, 1995

[54] SHIFTING APPARATUS FOR CONTROLLING A TRANSMISSION IN A VEHICLE

[76] Inventor: Patrick A. McFadden, 255 Woodside Dr., Pataskala, Ohio 43062

[21] Appl. No.: 197,150

[22] Filed: Feb. 16, 1994

[51] Int. Cl.⁶ .............................................. F16H 59/04
[52] U.S. Cl. .................................. 74/335; 74/336 R; 74/473 R
[58] Field of Search ................. 74/335, 336 R, 473 R, 74/337, 336.5, 336 B

[56] References Cited
U.S. PATENT DOCUMENTS

| | | | |
|---|---|---|---|
| 4,507,736 | 3/1985 | Klatt | 74/336 R |
| 4,646,582 | 3/1987 | Kijima | 74/473 R |
| 5,172,603 | 12/1992 | MacInnis | 74/335 |

FOREIGN PATENT DOCUMENTS 120522  6/1987  Japan ................................ 74/473 R

*Primary Examiner*—Charles A. Marmor
*Assistant Examiner*—Chong H. Kim
*Attorney, Agent, or Firm*—Mueller and Smith

[57] ABSTRACT

An improved shifter assembly useful in a multi-geared vehicle equipped with an in-line shifter having a front, a rear, an upstanding shift handle, and a cover which is attached to the vehicle by a housing attachment and which shifts the vehicle forward gears in a forward or reverse pattern with a shifter assembly. The improved shifter assembly includes a bracket mounted to the in-line shifter and attached to the vehicle by the housing attachment while the cover is in position; and an actuatable rod and piston assembly attached to the bracket and to the shift handle of an in-line shifter with shifter handle arc accommodation.

12 Claims, 16 Drawing Sheets

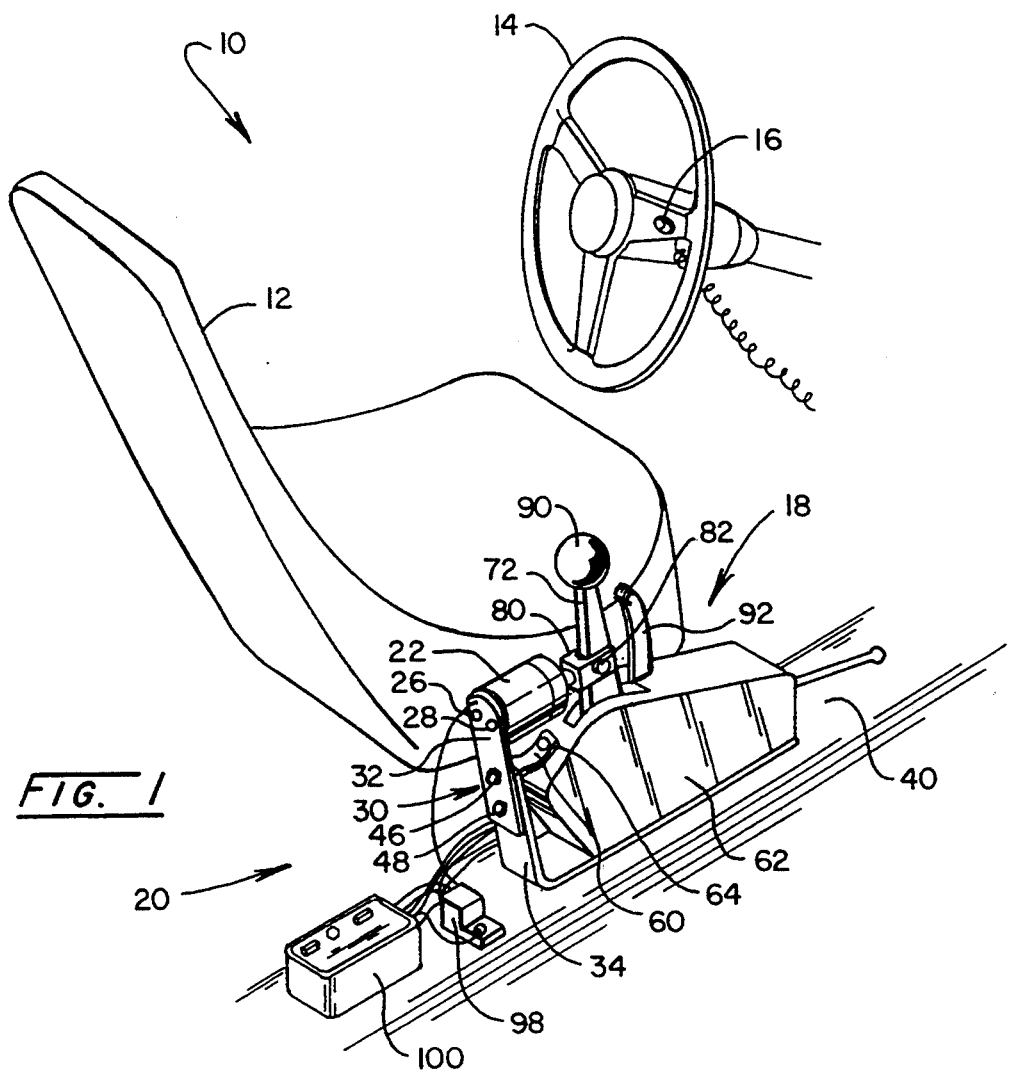
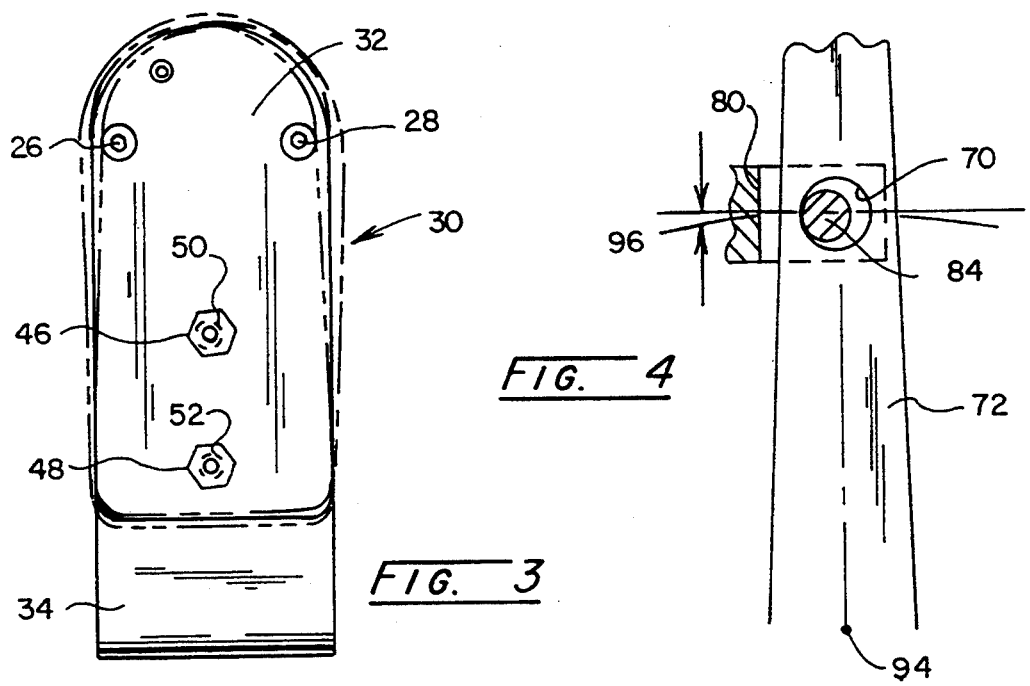

SHIFTING APPARATUS FOR CONTROLLING A TRANSMISSION IN A VEHICLE

BACKGROUND OF THE INVENTION

The present invention relates to a shifting apparatus for controlling a transmission in a vehicle and, more particularly, for controlling a shifter that controls the transmission of a drag race vehicle.

In the sport of automotive drag racing (which includes, drag racing, mud racing, sand racing, hill racing, and the like), automatic transmissions are converted with manual shift valve bodies with transbrakes (transmission brakes). The transbrake is used to hold the vehicle on the starting line through a solenoid attached to the valve body. Some vehicles are provided with a "roll control" solenoid that locks the brakes on the vehicle, acting in much the same manner as a transbrake. These solenoids are activated by a hold button, most often found on the steering wheel. A shifter is connected through a cable to the transmission controlling the valve body. The shifter is controlled manually by the driver when the tachometer reaches the rpm (revolutions per minute) level desired by the driver. The shifter can also be controlled by a pneumatic cylinder or an electric solenoid freeing the driver's hands. Manufacturers now offering this type of shifter control include Shifnoid (Columbus, Ohio), Dixie (Boone, N.C.), Dedenbear (Pleasant Hill, Calif.), and Advanced Control Devices (Alburtis, Pa.). The cylinder or solenoid is electronically connected through a control valve or a relay that is activated by a button or an rpm switch. This rpm switch is preset at the desired shift level. The shifter control is activated each time the desired rpm level is reached.

A multiple number of cylinders or solenoids can be attached to an in-line shifter activating each shift or gear change. Each cylinder or solenoid must have its own rpm switch set at the desired rpm level. The rpm switch for the first shift must be set at a lower rpm level than the rpm switch for the second shift, and so forth for each succeeding higher gear. Alternatively, a single cylinder or solenoid can be attached to a ratchet shifter controlling a multiple number of shifts at one rpm level. Advance Control Devices and Dixie are two manufacturers of pneumatic cylinder shifter controls for ratchet shifters.

SUMMARY OF THE INVENTION

In the present invention a solenoid is used on a ratchet shifter and is controlled through a relay by an electronic controller. This controller can be an analog, digital, or microprocessor driven device. The power supplied to the solenoid most conveniently is the existing battery of the vehicle. This power source is the only source needed, unlike pneumatic cylinders that require a bottle of compressed gas, e.g., air or $CO_2$.

The electronic controller is reset when the hold button is activated at the starting line. When the hold button is released, the vehicle launches violently at or above the rpm lock up of the transmission converter. This is sometimes referred to as "converter flash". If the rpm lock up of the converter is close to the rpm level setting for the first shift, or tire spin occurs, the rpm level will be reached prematurely causing the vehicle to shift early. The electronic controller has a preset time delay, disabling a shift, that begins when the hold button is released. This delay allows the vehicle to settle or sometimes referred to as "catch up" to the track before the first shift. The first shift occurs after the delay has timed out and when the preset rpm level is reached. When the transmission changes gears the rpm level of the engine falls off switching the controller. Ratchet shifters can allow as many shifts as there are gears in the transmission. The controller then is deactivated or set for the next shift if the transmission has more than two gears and is deactivated only after all gears have been accessed. Each shift can be controlled independently at the same rpm level or at different rpm levels. The first rpm level can be set lower or higher then the second rpm level. After the controller is deactivated, the engine can reach any rpm level above the shift rpm levels and the controller will not try to activate the solenoid.

BRIEF DESCRIPTION OF THE DRAWINGS

FIG. 1 is a perspective view showing the cockpit environment of a drag race vehicle with a ratchet shifter and controls;

FIG. 3 is a rear view of the bracket holding the solenoid to the shifter;

FIG. 4 is an enlarged sectional view of the clevis pin and shifter handle with receiver opening;

Figure 2:
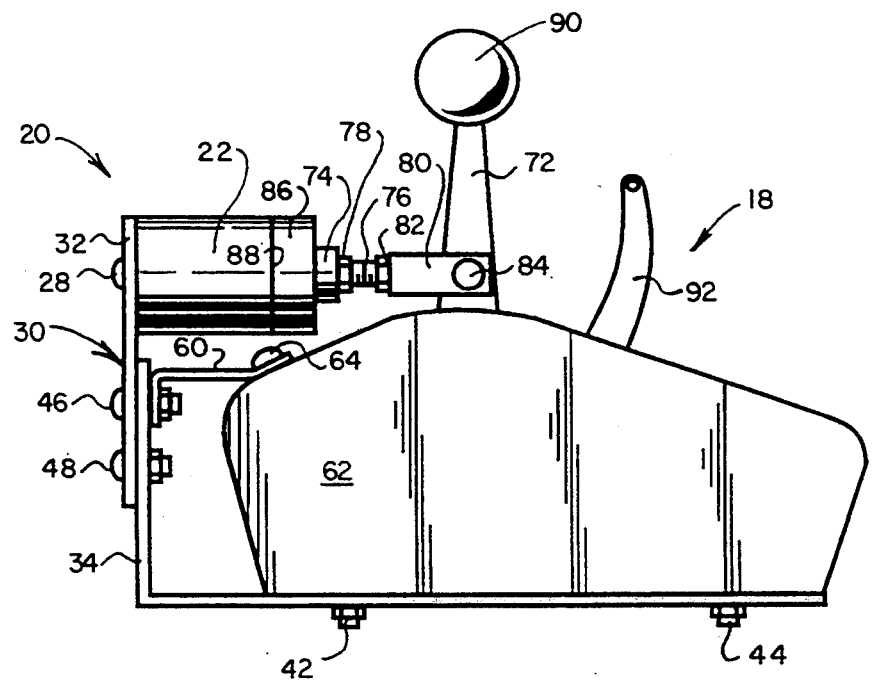
FIG. 2 is a side view of a ratchet shifter with a solenoid attached.

The drawings will be described in detail below.

DETAILED DESCRIPTION OF THE INVENTION

In the following description, the shifter is described with reference to a "ratchet type" shifter. However, it should be understood that the system may be applied to any electronically-controllable shifter manufactured for racing.

With specific reference to the drawings, cockpit environment 10 is illustrated generally in FIG. 1, having seat 12, steering wheel 14 with hold button 16, and ratchet shifter 18 with control system 20 of the present invention.

Solenoid 22 of control system 20 is attached to upper part 32 of a two-piece bracket 30 by screws 26 and 28. Lower part 34 of two-piece bracket 30 is mounted between shifter 18 and floor or mounting surface 40 by a pair of bolts 42 and 44 shown in FIG. 2. Pans 32 and 34 of bracket 30 are attached together by bolts 46 and 48, through enlarged holes 50 and 52. Parts 32 and 34 of bracket 30 can be adjusted by loosening bolts 46 and 48, and moving upper pan 32 a small amount vertically and laterally within enlarged holes 50 and 52 shown by phantom lines in FIG. 3. There is also small support bracket 60 attached to body 62 of shifter 18 with screw 64. The other end of the small support bracket 60 is bent at a right angle and is fastened to bracket 30 by bolt 46. It is apparent that bracket 30 can be made of one-piece with no adjustment means. The adjustment means is necessary if receiver opening 70 in handle 72, shown in FIG. 4, of shifter 18 is drilled improperly by the end user.

Plunger 74 must be aligned properly so there is no bind when it moves within solenoid 22. This is accomplished through adjustment of bracket 32. Plunger 74 also can be adjusted in or out of solenoid 22 by threaded rod 76. Rod 76 is threaded into a hole, not shown, in plunger 74. Rod 76 is held in place in plunger 74 by jam nut 78. The other end of rod 76 is threaded into a hole, not shown, in clevis 80 and locked in place by jam nut 82. Clevis 80 is attached to shifter handle 72 by pin 84 through receiver opening 70. Extension cap 86 is added to front 88 of solenoid 22 keeping plunger 74 from falling out of front 88 of solenoid 22 when handle 72 of the ratchet shifter 18 is moved manually forward by the driver's hand on gear shift ball 90. Shifter 18 has a reverse lock out that can be disabled by lever 92.

Solenoid 22 of system 20 is activated through interface relay 98 that is controlled by controller 100 shown in FIG. 1. Plunger 74 moves freely in solenoid 22 when shifting manually. Handle 72 through ball 90 is ratcheted forward by the driver's hand shifting the transmission to park. When handle 72 is pulled backwards, reverse gear is selected. By releasing and then pulling handle 72 backwards a second time, neutral is selected in the transmission. First or low gear is the next position of shifter 22 in a reverse pattern valve body and then second gear, high gear in a two-speed transmission, and then finally third or high gear in a three-speed transmission. Handle 72 is ratcheted backwards to change gears from first to third and is ratcheted forward to change gears from third to first in a reverse pattern valve body.

Plunger 74 of solenoid 22 is connected to handle 72 through rod 76 and clevis 84. Handle 72 is activated automatically when solenoid 22 of system 20 is energized. Rod 76 is lengthened or shortened by threading clevis 80 or plunger 74 in or out. This allows plunger 74 to be adjusted to an optimal position. When solenoid 22 is energized, plunger 74 is pulled back into solenoid 22 pulling shifter handle 72 to the next gear. When handle 72 rotates forward or rearward on axis point 94, the center line of plunger 74 follows a tangent to this rotation or arc, as shown in FIG. 4. There is a distance of arcing travel, shown as item 96, that will cause plunger 74 to bind in solenoid 22 since the rear of solenoid 22 is rigidly mounted. Arcing travel distance 96 is eliminated by receiver opening 70 being larger in diameter than the diameter of clevis pin 84. Clevis pin 84 moves in an up motion or a down motion within receiver opening 70. Receiver opening 70 is shown as a round hole in FIG. 4, but it should be understood that other configurations are possible, for example, a slot in a radial direction of the arcing travel.

Figure 5:
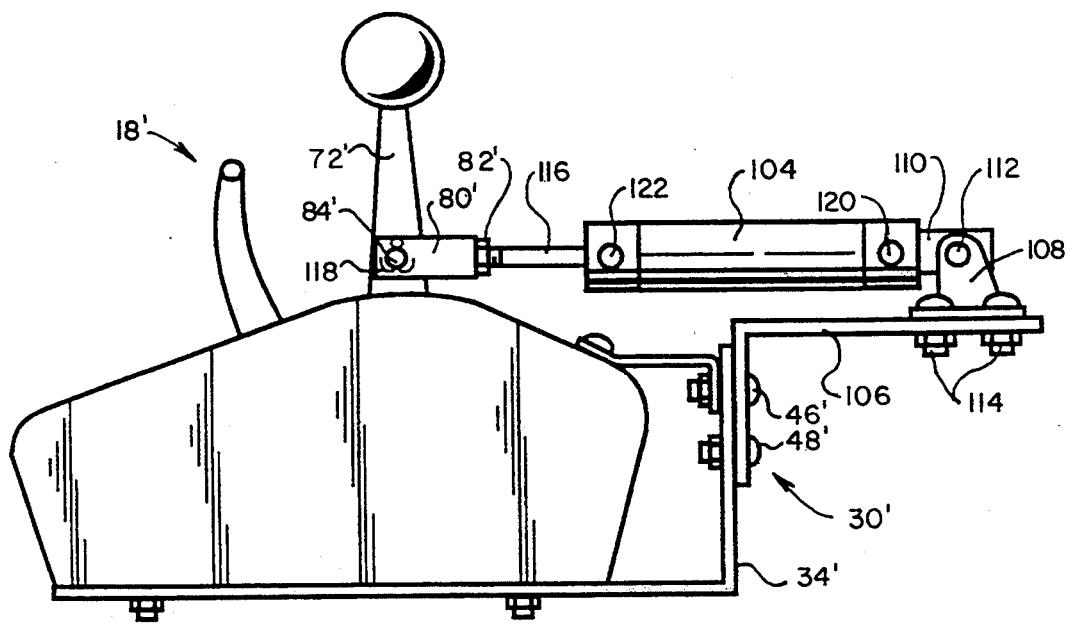
FIG. 5 is a side view of a ratchet shifter with a pneumatic cylinder attached.

For a forward shifting valve body transmission, shifter handle 72 has to be pushed forward. This is achieved by using a push-type solenoid or a pneumatic cylinder. Pneumatic cylinder 104 is attached to shifter 18' through two-piece bracket 30', shown in FIG. 5. Pneumatic cylinder 104 is attached to upper part 106 of two-piece bracket 30' by pivot 108. Rear 110 of cylinder 104 rotates through pin 112 of pivot 108. Pivot 108 is attached to upper part 106 of two-piece bracket 30' by bolts and nuts 114. Upper part 106 is attached to L-shaped lower part 34' of two-piece bracket 30' by bolt 46' and 48', similar to that in FIG. 2. Piston rod 116 of cylinder 104 threads into clevis 80' and is locked into place by jam nut 82'. Clevis 80' is connected to shifter handle 72' by clevis pin 84' and this pin is held in place by cotter pin 118. If pneumatic pressure is applied to rear opening 120 of cylinder 104, piston rod 116 pushes shifter handle 72' forward to the next gear. The need for a larger receiver opening in shifter handle 72' is not necessary because of pivot 108 on rear 110 of cylinder 104. Pneumatic cylinder 104 can also pull shifter handle 72' rearward, similar to that as shown in FIG. 2, by applying pneumatic pressure to front opening 122 of cylinder 104. The pneumatic shifter control shown in FIG. 5 can operate either a forward or reverse pattern valve body transmission. The pneumatic pressure is supplied to cylinder 104 through port 120 or port 122 by a storage bottle, not shown, through a solenoid valve. This valve is controlled by controller 100.

Figure 6:
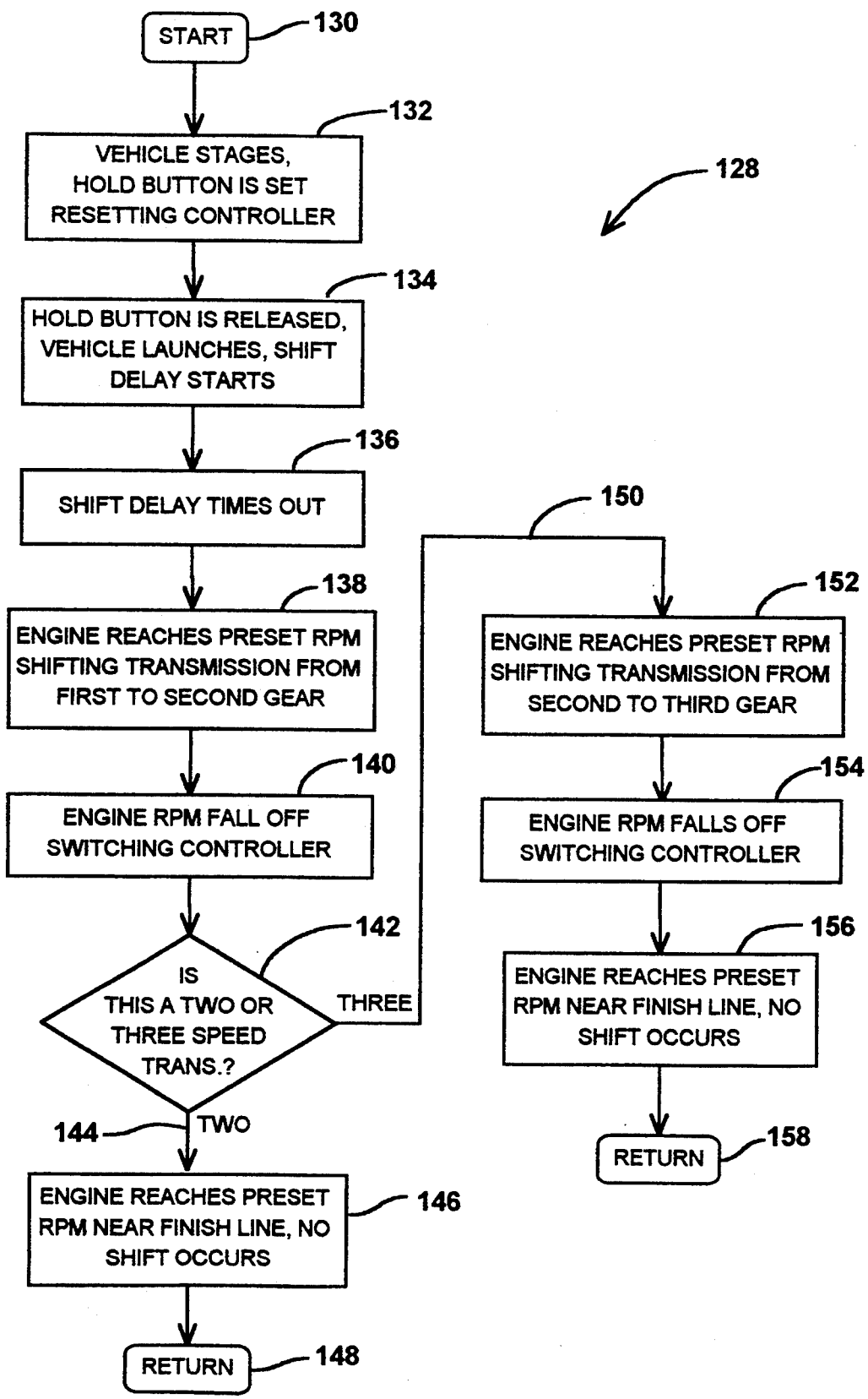
FIG. 6 is a flow diagram of a system for controlling a two or three speed transmission.

System 20 is logically controlled by controller 100. FIG. 6 depicts flow diagram 128 representing the logic of controller 100. Initially, the driver sets controller 100 with rpm levels corresponding to the number of (forward) transmission gears that the vehicle has. The vehicle reaches the starting line represented by start box 130. At box 132, controller 100 is reset by the driver activating hold button 16 on steering wheel 14 of the race vehicle. The race vehicle is locked in place on the starting line of the drag strip and the engine is engaged bringing the engine speed or rpm's to the lock-up of the transmission converter. At box 134, the hold button is released by the driver allowing the vehicle to launch, flashing the converter and shocking the tires, sometimes causing the rpm's of the engine to reach the shift point prematurely. A time delay also starts at box 134 when the hold button is released delaying any shift if the rpm's of the engine reaches the shift point. This time delay allows the vehicle to catch up to the track or settle in allowing the tires to hook up. At box 136, the time delay times out before the engine reaches the shift point. The time delay can be adjustable so the delay can be shorter or longer depending on the performance of the vehicle. At box 138, the preset shift point is reached by the engine rpm shifting the transmission to the next gear When the gear change is made the rpm's of the engine are pulled down or lowered at box 140, switching controller 100 to the next function. At box 142, a question is asked: is this a two or three speed transmission? If the vehicle has a two speed transmission the logic flows through line 144 to box 146 where the engine of the vehicle is permitted to now reach any rpm level above the shift point without activating the shifter. Finally, at box 148, the logic sequence returns to the box 130. At box 142 if the vehicle has a three speed transmission, the logic flows through line 150 to box 152 where the engine of the vehicle is permitted to now reach the preset shift point shifting the transmission to the next gear of the transmission. At box 154, when the gear change is made, the rpm's of the engine are pulled down or lowered switching controller 100 to box 156. At box 156, the engine of the vehicle is permitted to now reach any rpm level above the shift point without activating the shifter. The sequence then returns to box 130 represented by return box 158. The routine from box 142 to box 154 can be repeated as many times as the transmission has gears. Once the last gear has been accessed, the sequence proceeds to box 156 and continues as described above.

Figure 7:
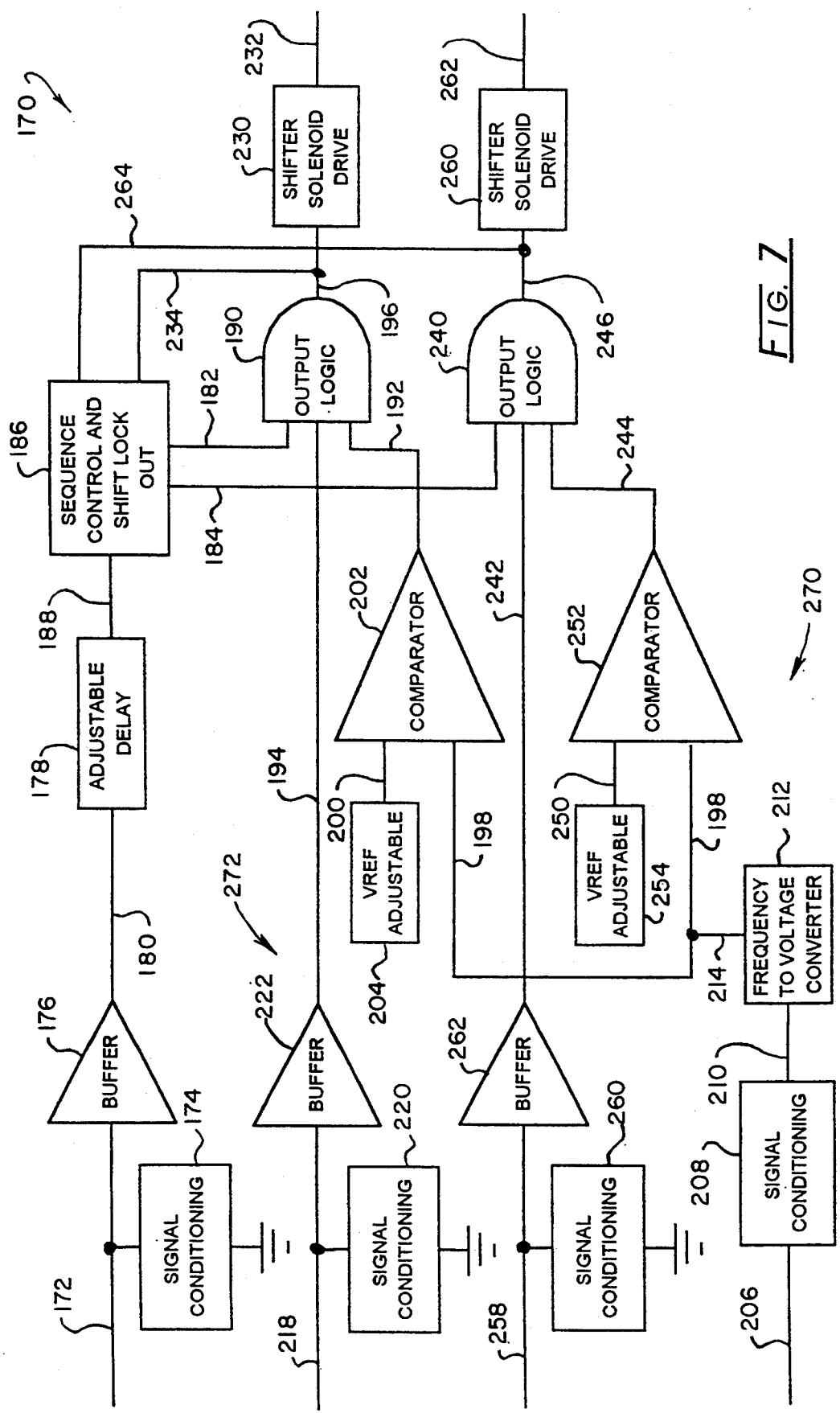
FIG. 7 is an electrical block diagram of a controller for a system for controlling a two or three speed transmission.

A block diagram of electrical circuit 170 of control system 20 is represented in FIG. 7. A +12 v signal is present on line 172 when the hold button is activated by the driver. This high signal is filtered or brought to a usable level through signal conditioning circuit 174 and buffer circuit 176. Adjustable delay circuit 178 is started when the high signal goes low through line 180 which occurs when the driver releases the holds button. Time delay circuit 174 hold the signals on lines 182 and 184 of sequence control and shift lock out circuit 186 from going high through line 188. When the time delay times out, line 182 goes high.

Logic circuit 190 senses this high signal on line 182 and with the high signal of line 192 or 194 causes line 196 to go high. The high signal on line 192 is present when the voltage of lines 198 and 200 are the same which is accomplished through comparator circuit 202. The voltage signal on line 200 is an adjustable reference voltage set by vref circuit 204. This preset voltage on line 200 is compared to the voltage on line 198 that was convened from a pulse signal or an rpm signal on line 206. The pulse signal on line 206 is filtered or brought to a usable frequency through signal conditioning circuit 208 and then through line 2 10 to the frequency to voltage converter circuit 212. Converter circuit 212 converts this frequency to a voltage level and sends it to the comparator through lines 214 and 198. When the voltage level on line 198 reaches the same level as the preset voltage on line 200, line 192 goes high.

The high signal on line 194 is present when a signal from an external rpm switch or an external button, not shown, is sensed on line 218. This signal on line 218 is filtered or brought to a usable level through signal conditioning circuit 220 and buffer 222.

Logic circuit 190 receives these high signals on lines 182 and 192, or 182 and 194, creating a high signal on line 196. This signal drives shifter solenoid drive 230 activating a solenoid through line 232. This solenoid is either a solenoid valve that controls a pneumatic cylinder that activates the shifter handle or is a relay that controls a solenoid that activates the shifter handle.

When the signal on line 196 goes low because the rpm's of the engine fall off dropping out the high signal on line 192, line 234 goes low causing the high signal on line 182 to go low and the signal on line 184 to go high through sequence control and shift lock out circuit 186.

Logic control circuit 240 senses this high signal on line 184 and with the high signal of line 242 or 244 causes line 246 to go high. The high signal on line 242 is present when the voltage of line 198 and 250 are the same which is accomplished through comparator circuit 252. The voltage signal on line 250 is an adjustable reference voltage set by vref circuit 254. The preset voltage on line 250 is compared to the voltage on line 198 that was converted from a pulse signal or a rpm signal on line 206. When the voltage level on line 198 reaches the same level as the preset voltage on line 250, line 244 goes high.

The high signal on line 242 is present when a signal from an external rpm switch or an external button, not shown, is sensed on line 258. This signal on line 258 is filtered or brought to a usable level through signal conditioning circuit 260 and buffer 262. The external rpm switch can be the same rpm switch that is on line 218 so the rpm shift level is the same or can be different rpm switches so the rpm shift level can be different.

Logic circuit 240 receives these high signals on lines 184 and 242, or 184 and 244, creating a high signal on line 246. This signal drives shifter solenoid drive 260 activating solenoid through line 262. The solenoid is either a solenoid valve that controls a pneumatic: cylinder that activates the shifter handle or is a relay that controls a solenoid that activates the shifter handle.

When the signal on line 246 goes low because the rpm's of the engine fall off dropping out the high signal on line 244, line 264 goes low causing the high signal on line 184 to go low through sequence control and shift lock out circuit 186. When the lines 182 and 184 of sequence control and shift lock out circuit 186 are both low, all shifts are locked out until the sequence is started over by the driver activating the hold button.

It will be noted that control circuit 170 can be operated by its own internal rpm circuit 270 or by external rpm switches through circuit 272. This is necessary because some ignition systems have magnetos that have special rpm switches. The controller can be produced with both circuits 270 and 272 or with only one circuit.

Figure 8:
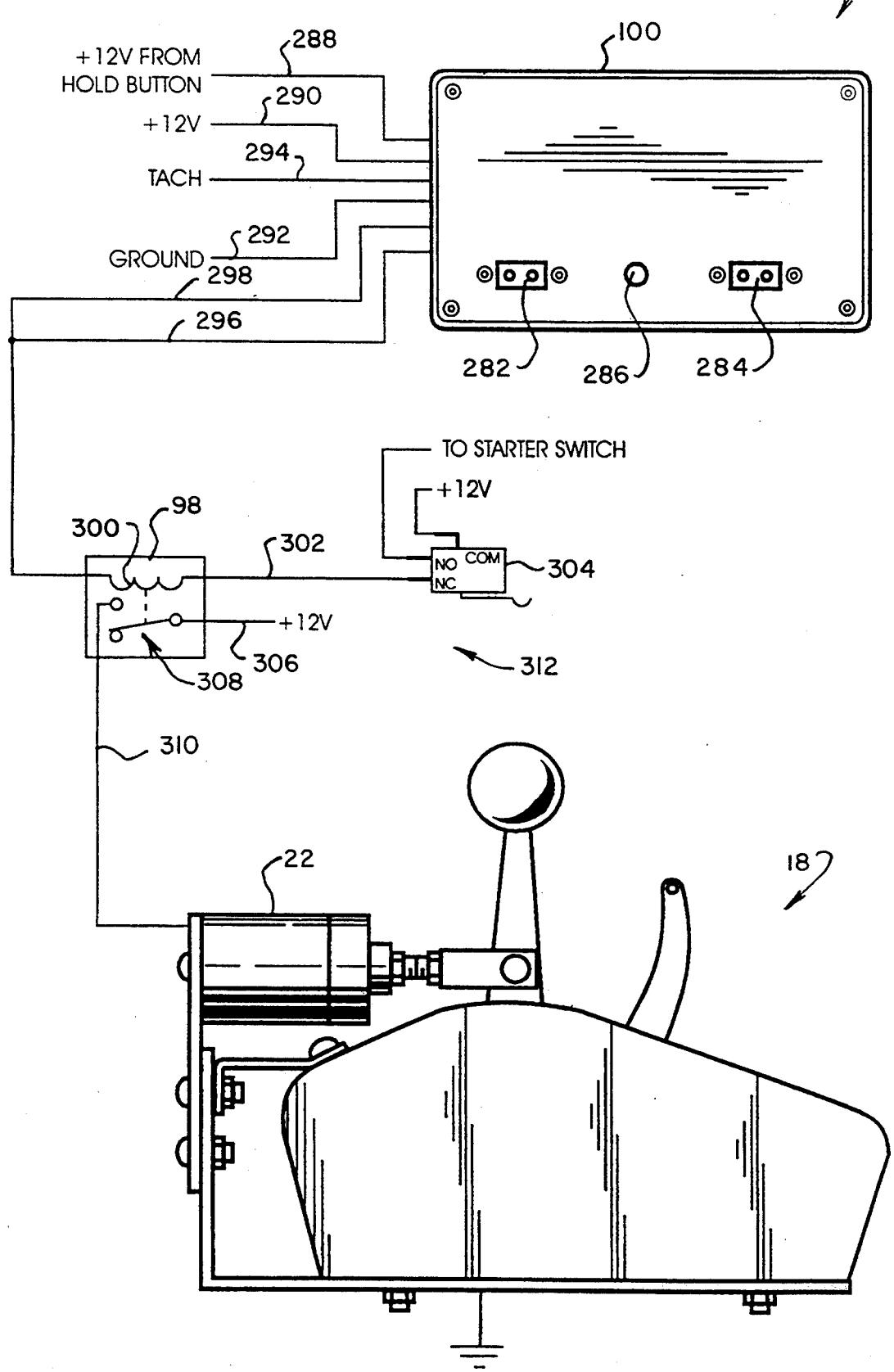
FIG. 8 is a diagram of a system for controlling a two or three speed transmission with a ratchet shifter and solenoid.

Shown in FIG. 8 is wiring diagram 280 of solenoid shifter control system 20 for a two or three speed ratchet shifter illustrated in FIG. 1. Controller 100 has two sockets 282 and 284 that receive rpm modules, not shown, that set the rpm levels for the gear changes. Socket 282 is for the first gear change and socket 284 is for the second gear change. First socket 282 is the only one used for a two speed shifter and sockets 282 and 284 are used for a three speed shifter. LED indicator light 286 is lit when the delay circuit is activated by the driver through the hold button on line 288 supplying a +12 V signal to controller 100. Line 290 is a +12 V power supply and line 292 is a ground to controller 100. Tachometer line 294 supplies a pulse signal to controller 100. Lines 96 and 298 are solenoid drive signals 232 and 262 explained earlier in controller circuit 172 shown in FIG. 7. Line 296 drives inductor or coil 300 of interface relay 98 by closing it to ground. +12 V power is supplied to the interface relay by line 302 through neutral safety switch 304. Relay coil 300 has a low amperage draw so not to damage controller 100. Interface relay 98 isolates the low amperage draw of controller 100 from the high amperage draw of solenoid 22. The power to solenoid 22 is supplied through line 306 when relay 98 is activated by controller 100 closing points 308 and completing the circuit through line 310.

Neutral safety switch 304 will not allow a shift to occur when shifter 18 is in the neutral or park position, but will allow the engine to start. When the shifter is in the first gear position, interface relay 98 is receiving voltage through line 302 from neutral safety switch 304. Safety circuit 312 is necessary so that an unintended shift will not occur.

If shifter 18 is attached to a two speed transmission, there is only need to activate shifter 18 once. This is accomplished by only inserting a rpm module in socket 282 or by only connecting line 296 to relay 98. Shifter 18 is activated twice when attached to a three speed transmission. This is accomplished by inserting a rpm module in both sockets 282 and 284, and connecting lines 296 and 298 to interface relay 98 as shown in diagram 280.

Figure 9:
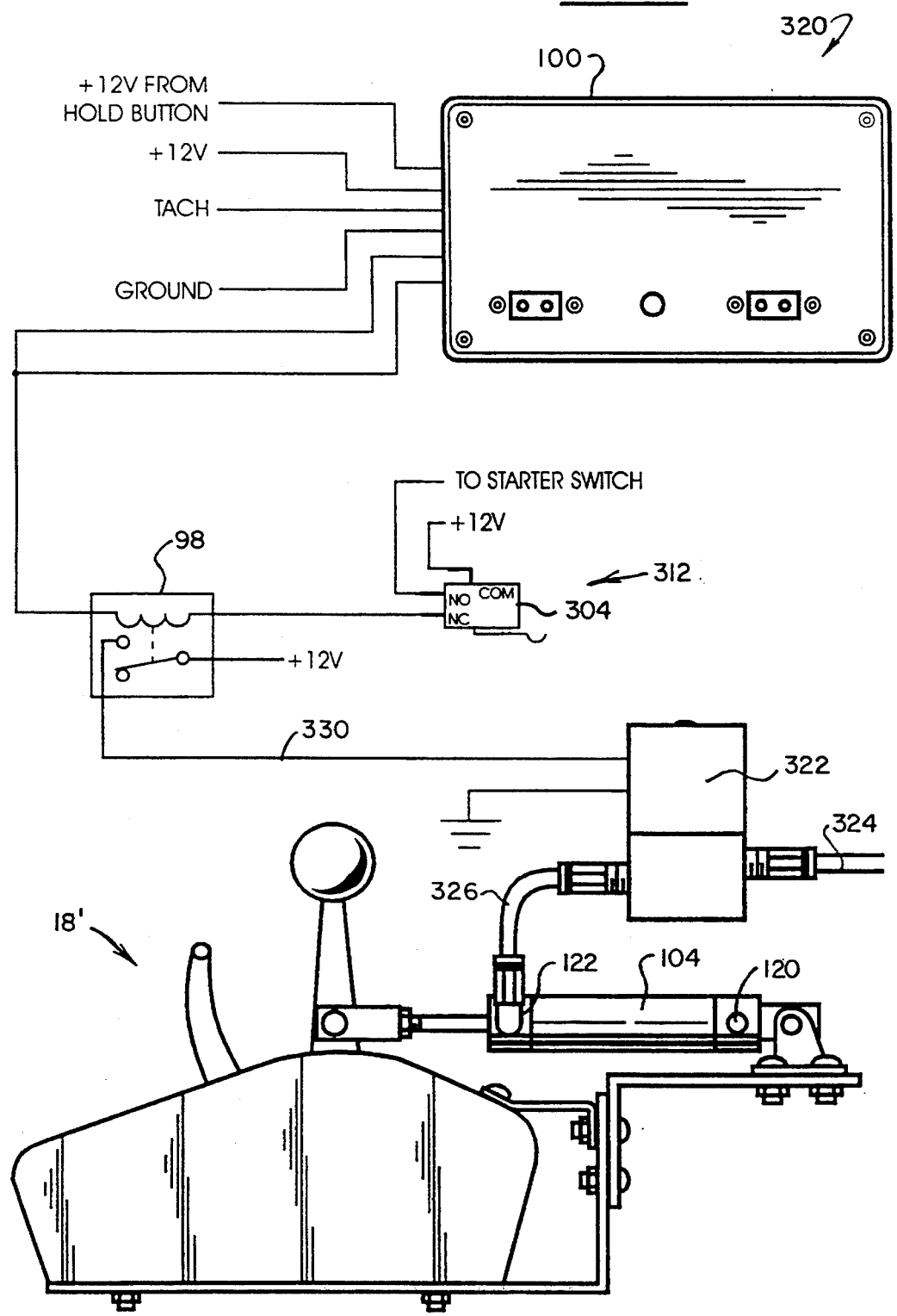
FIG. 9 is a diagram of a system for controlling a two or three speed transmission with a ratchet shifter and pneumatic cylinder.

Shown in FIG. 9 is wiring diagram 320 which similar to that of FIG. 8, except that pneumatic cylinder 104 is shown (as explained earlier in FIG. 5) connected to ratchet shifter 18'. Controller 100, interface relay 98, safety circuit 312, and line connections are the same as those explained in FIG. 8. Pneumatic pressure is supplied to cylinder 104 through line 326 connected to solenoid valve 322. Valve 322 is supplied pressure through line 324 by an on-board bottle of compressed air, $CO_2$, or other appropriate gas, not shown. Solenoid valve 322, through line 330, is controlled in the same manner as solenoid 22 in FIG. 8 and can also control a two or three speed transmission. Diagram 320 shows supply line 326 connected to opening 122 of cylinder 104. Opening 122 is for a reverse pattern valve body in a transmission. If line 326 is connected to opening 120 of cylinder 104, the shifter control can be used on a forward pattern valve body in a transmission. When the solenoid valve receives a +12 V signal through line 330 from relay 98, pneumatic pressure is supplied to the pneumatic cylinder shifting the transmission to the next gear.

Figure 10:
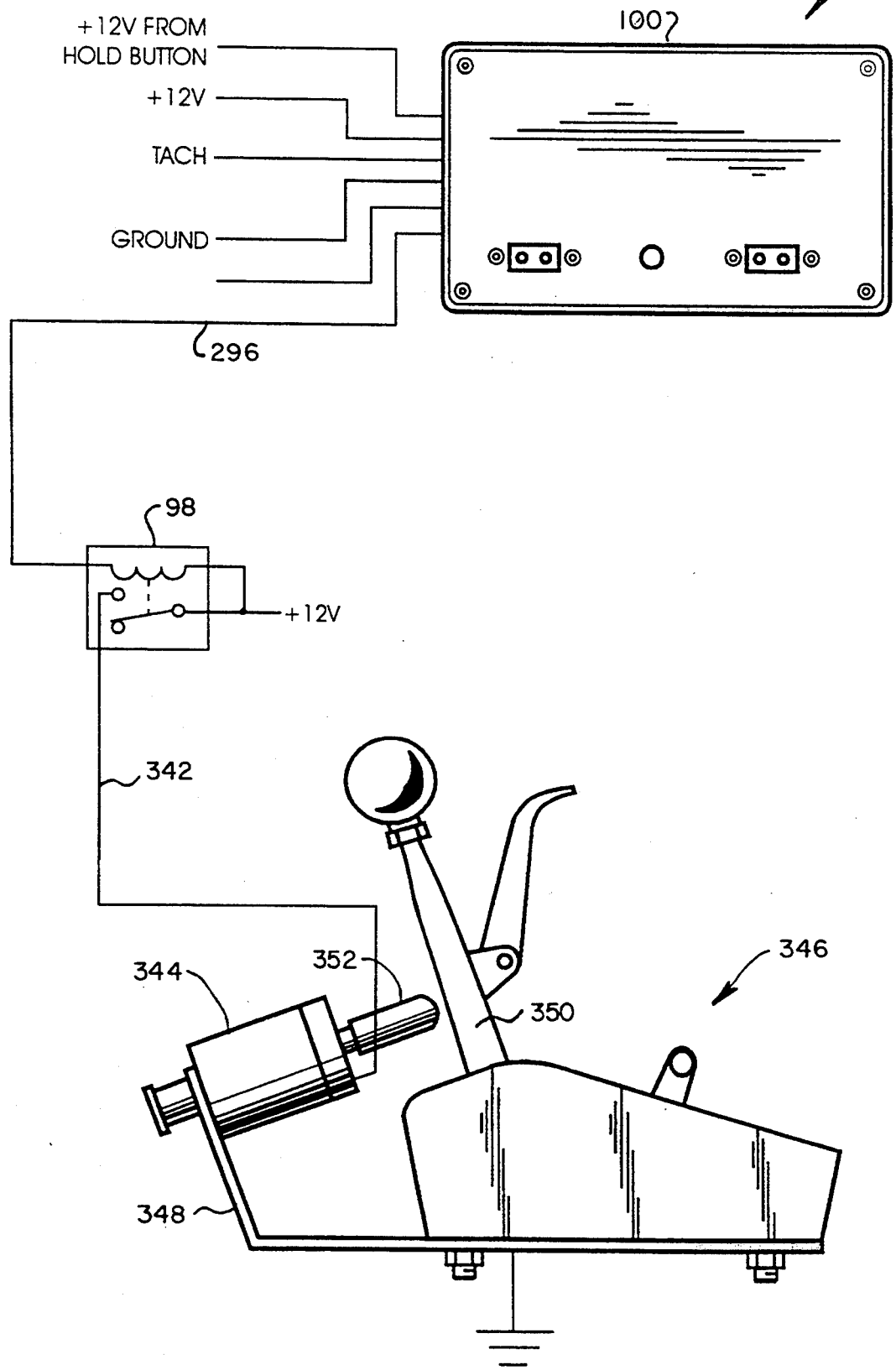
FIG. 10 is a diagram of a system for controlling a two speed transmission with an in line forward pattern shifter and solenoid.

Now referring to FIGS. 10 through 16, shown are wiring diagrams connected to in-line two and three speed shifters. Shown in FIG. 10 is wiring diagram 340, for a solenoid controlled two speed in-line shifter with a forward shifting valve body in a transmission, with controller 100 and interface relay 98 described in the previous figures. Line 296 is the only line connected to relay 98, previously described in FIG. 8, allowing solenoid 344 only to be activated once. The solenoid is mounted to shifter 346 by bracket 348. When handle 350 of shifter 346 is pulled to its most rearward position, the transmission's first gear will be engaged. This aligns tip 352 of solenoid 344 with handle 350 of shifter 346. When solenoid 244 is activated by controller 100 through interface relay 98, tip 352 pushes shifter handle 350 forward into second or high gear.

Figure 11:
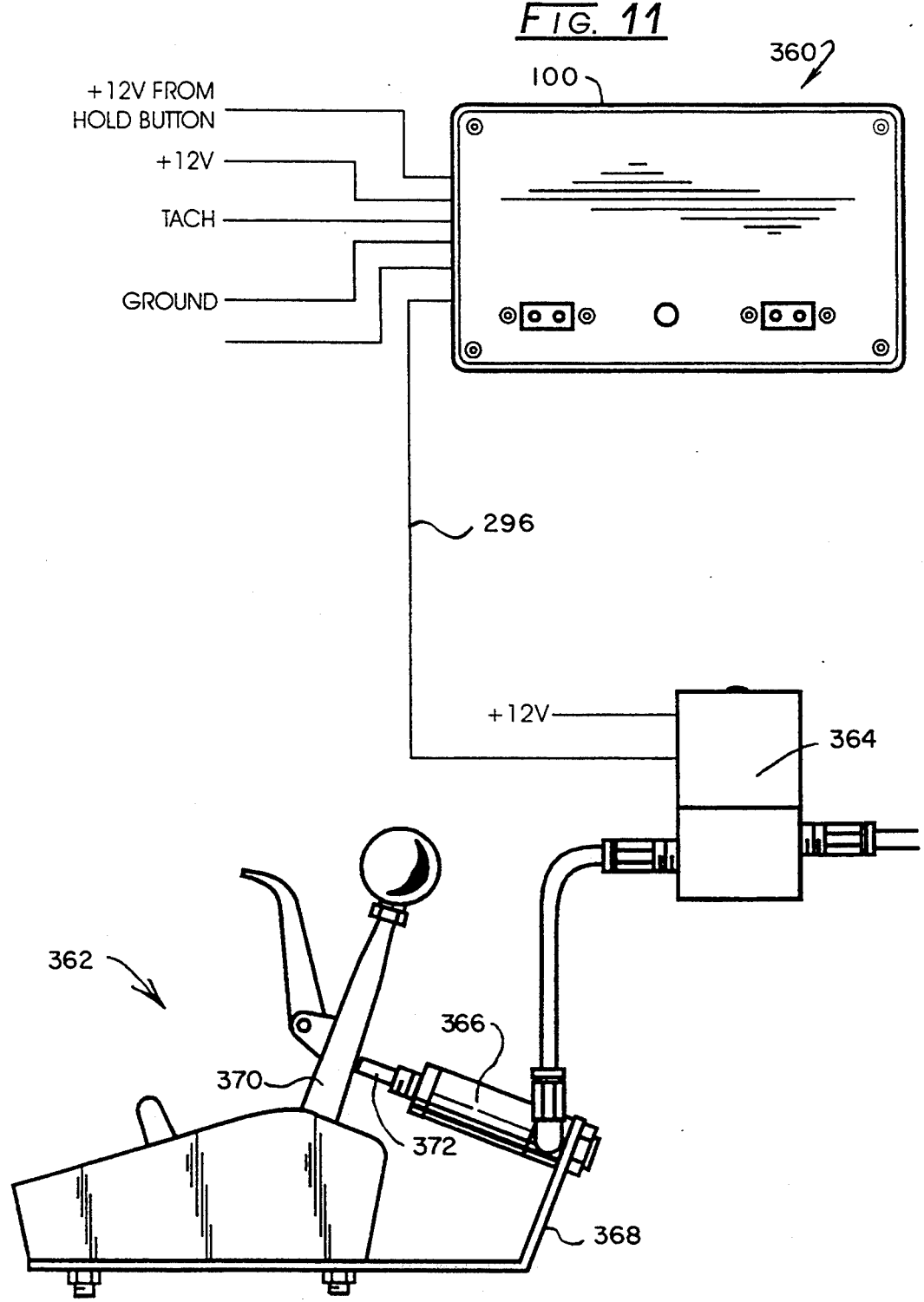
FIG. 11 is a diagram of a system for controlling a two speed transmission with an in line forward pattern shifter and pneumatic cylinder.

Shown in FIG. 11 is wiring diagram 360 connected to pneumatic controlled in line two speed forward shifting shifter 362 with controller 100 as described in previous figures. Solenoid valve 364 is controlled through line 296 of controller 100. When solenoid valve 364 is activated, it supplies pneumatic pressure to pneumatic cylinder 366, mounted to shifter 362 by bracket 368 that pushes shifter handle 370 forward with its piston rod 372 into the second or high gear similar to that shown in FIG. 10.

Figure 12:
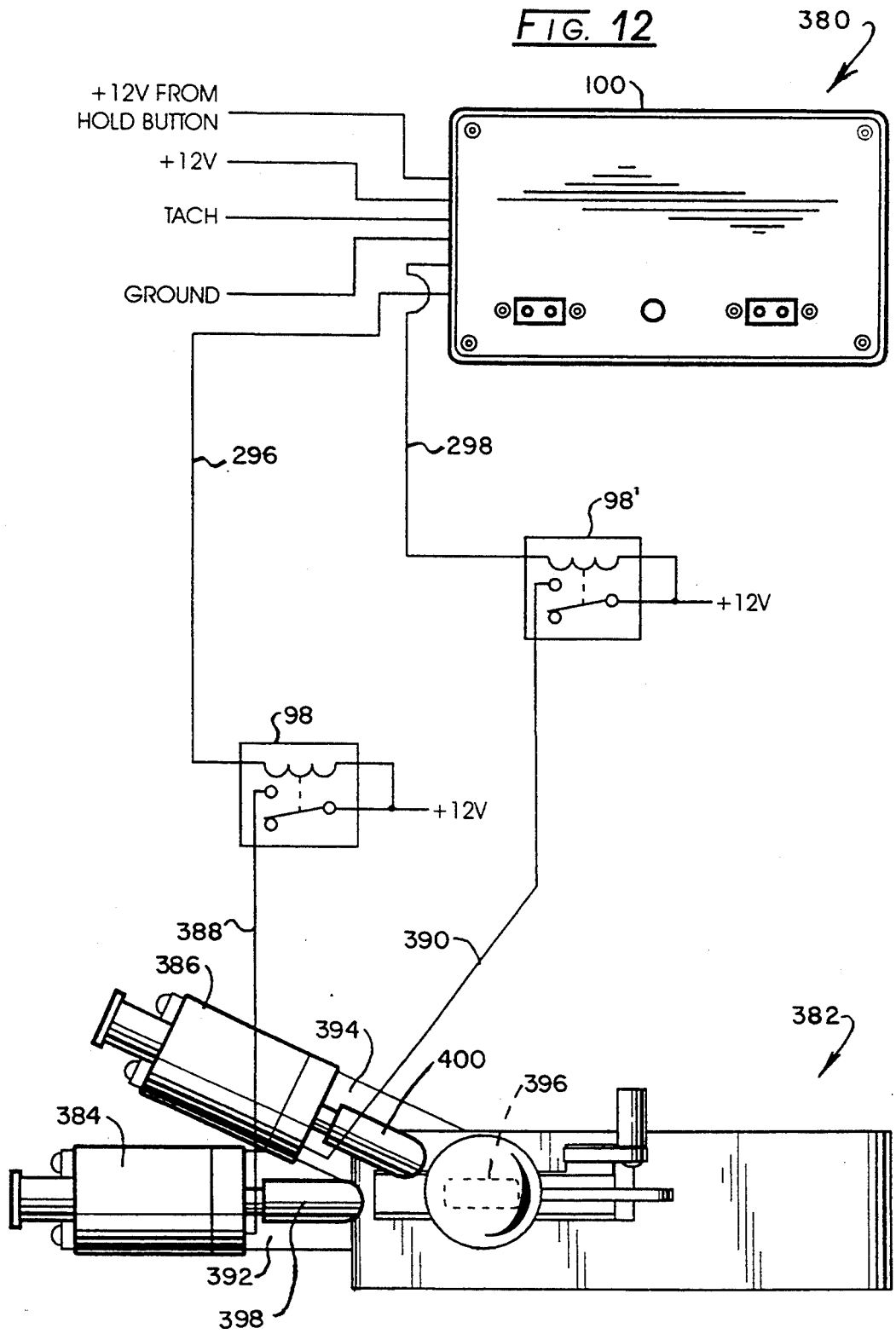
FIG. 12 is a diagram of a system for controlling a three speed transmission with an in line forward pattern shifter and two solenoids.

Shown in FIG. 12 is wiring diagram 380 for a solenoid controlled three speed in-line shifter with a forward shifting valve body transmission, with controller 100 and interface relay 98 as described in FIG. 10. Line 296 controls interface relay 98 and line 298 controls interface relay 98'. Solenoid 384 is mounted to shifter 382 by bracket 392. Tip 398 pushes shifter handle 396 into second gear as described previously. Tip 400 of solenoid 386 is positioned so that it clears shifter handle 396 when pushed into second gear. Solenoid 386 is mounted to shifter 382 by bracket 394 and its tip 400 is aligned with shifter handle 396 when the shifter is in second gear. Solenoid 386 is activated by interface relay 98' through line 390. When solenoid 386 is activated by the controller 100 through interface 98', tip 400 pushes the shifter handle forward into third or high gear.

Figure 13:
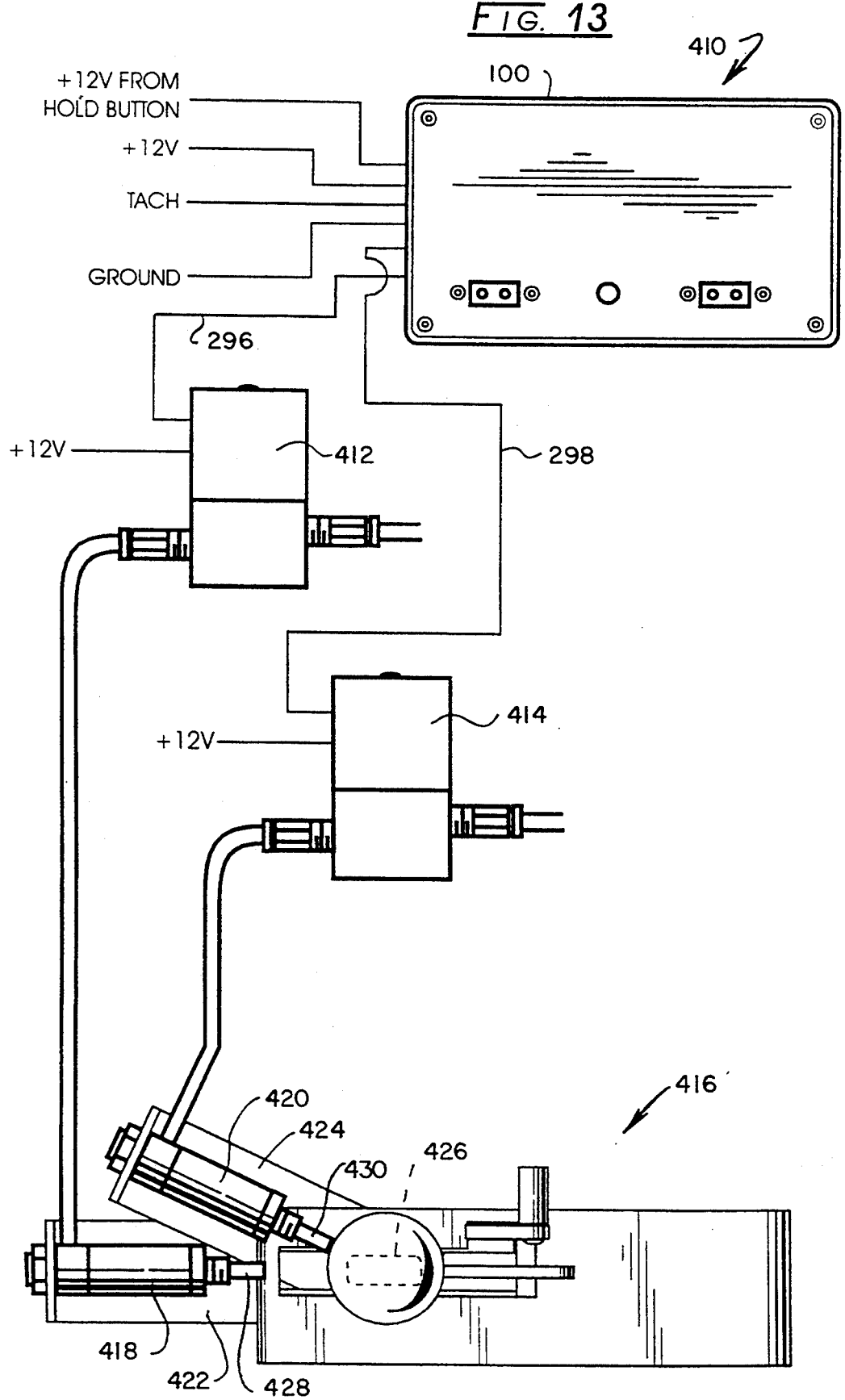
FIG. 13 is a diagram of a system for controlling a three speed transmission with an in line forward pattern shifter and two pneumatic cylinders.

Shown in FIG. 13 is wiring diagram 410 connected to pneumatic controlled in-line three speed forward shifting shifter 416 with controller 100 as described in previous figures. Solenoid valve 412 is controlled through line 296 of controller 100. When solenoid valve 412 is activated, it supplies pneumatic pressure to pneumatic cylinder 418, mounted to shifter 416 by bracket 422, that pushes shifter handle 426 forward with its piston rod 428 into second gear. Solenoid valve 414 is controlled by line 298 of controller 100. When solenoid valve 414 is activated it supplies pneumatic pressure to pneumatic cylinder 420, mounted to shifter 416 by bracket 424, that pushes shifter handle 426 with its piston rod 430 into third or high gear similar to that shown in FIG. 12.

Figure 14:
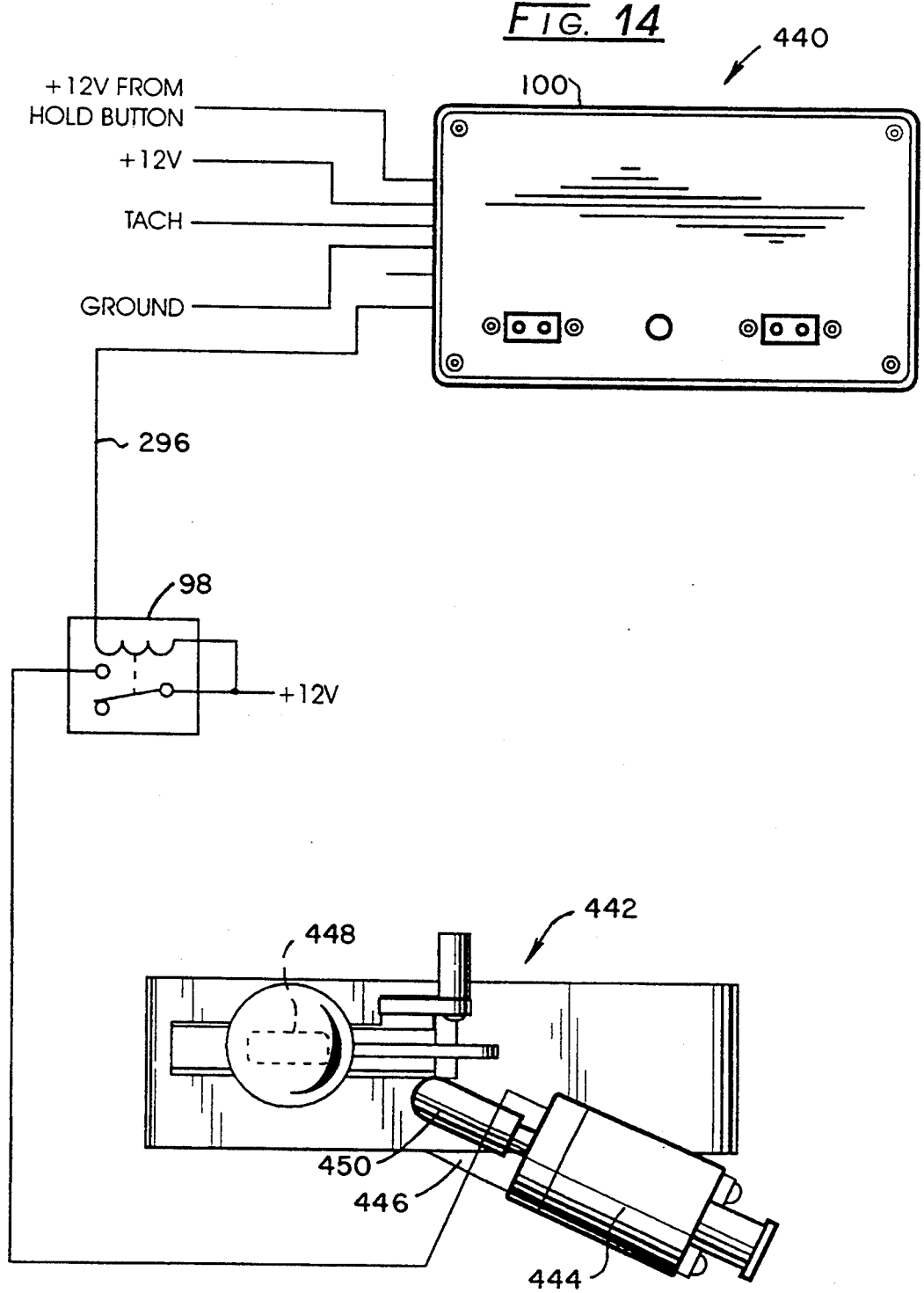
FIG. 14 is a diagram of a system for controlling a two speed transmission with an in line reverse pattern shifter and solenoid.

Shown in FIG. 14 is wiring diagram 440 for a solenoid controlled two speed in-line shifter with a reverse shifting valve body transmission. Solenoid 444 is mounted to shifter 442 by bracket 446 so that shifter handle 448 can be pushed rearward by tip 450 of solenoid 444. The control of this solenoid is the same as in FIG. 10.

Figure 15:
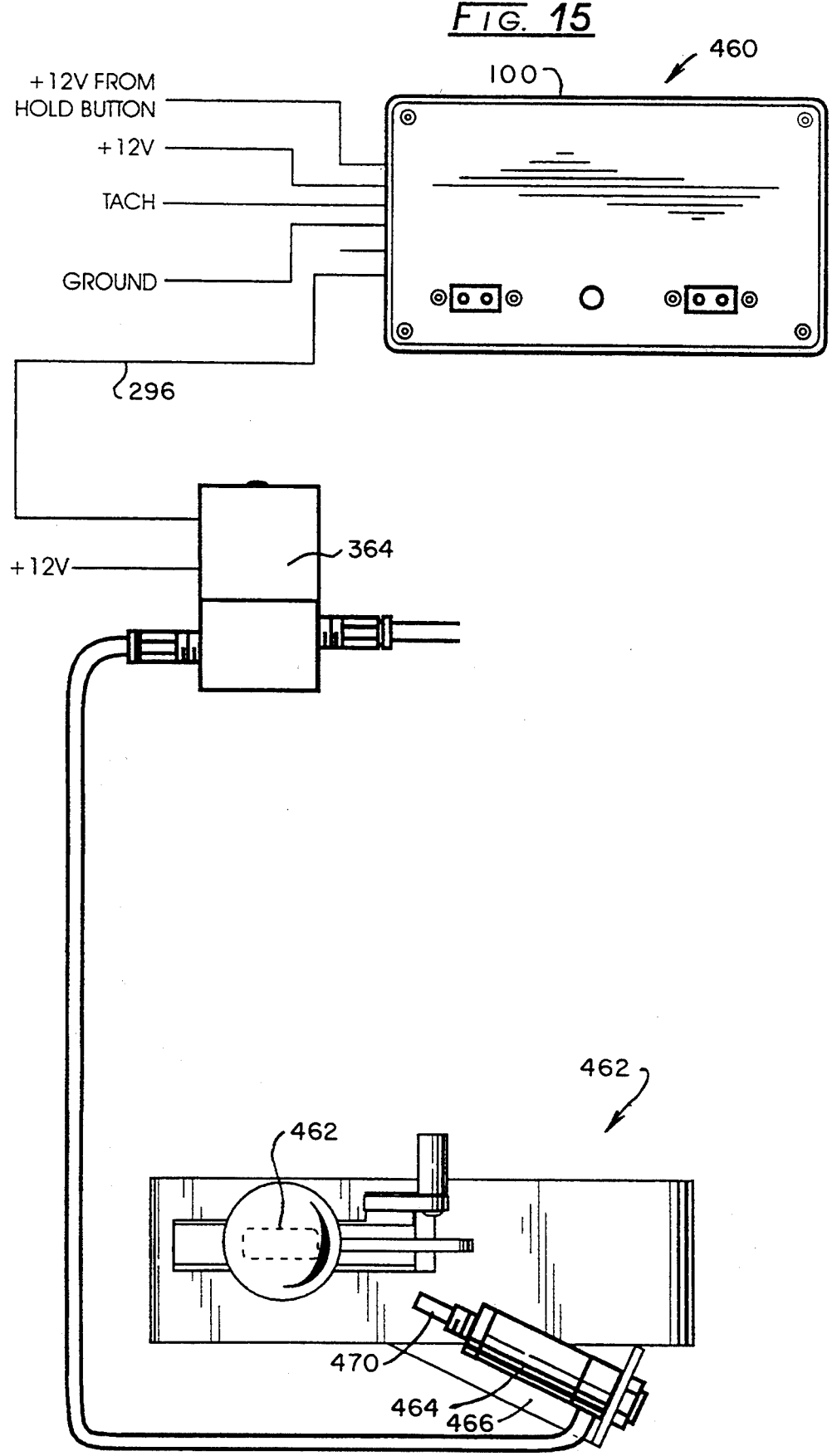
FIG. 15 is a diagram of a system for controlling a two speed transmission with an in line reverse pattern shifter and pneumatic cylinder.

Shown in FIG. 15 is wiring diagram 460 connected to a pneumatic controlled in-line two speed reverse shifting shifter. Pneumatic cylinder 464 is mounted to shifter 462 by bracket 466 so that shifter handle 468 can be pushed rearward by push rod 470 of cylinder 464. The control of this cylinder is the same as in FIG. 11.

Figure 16:
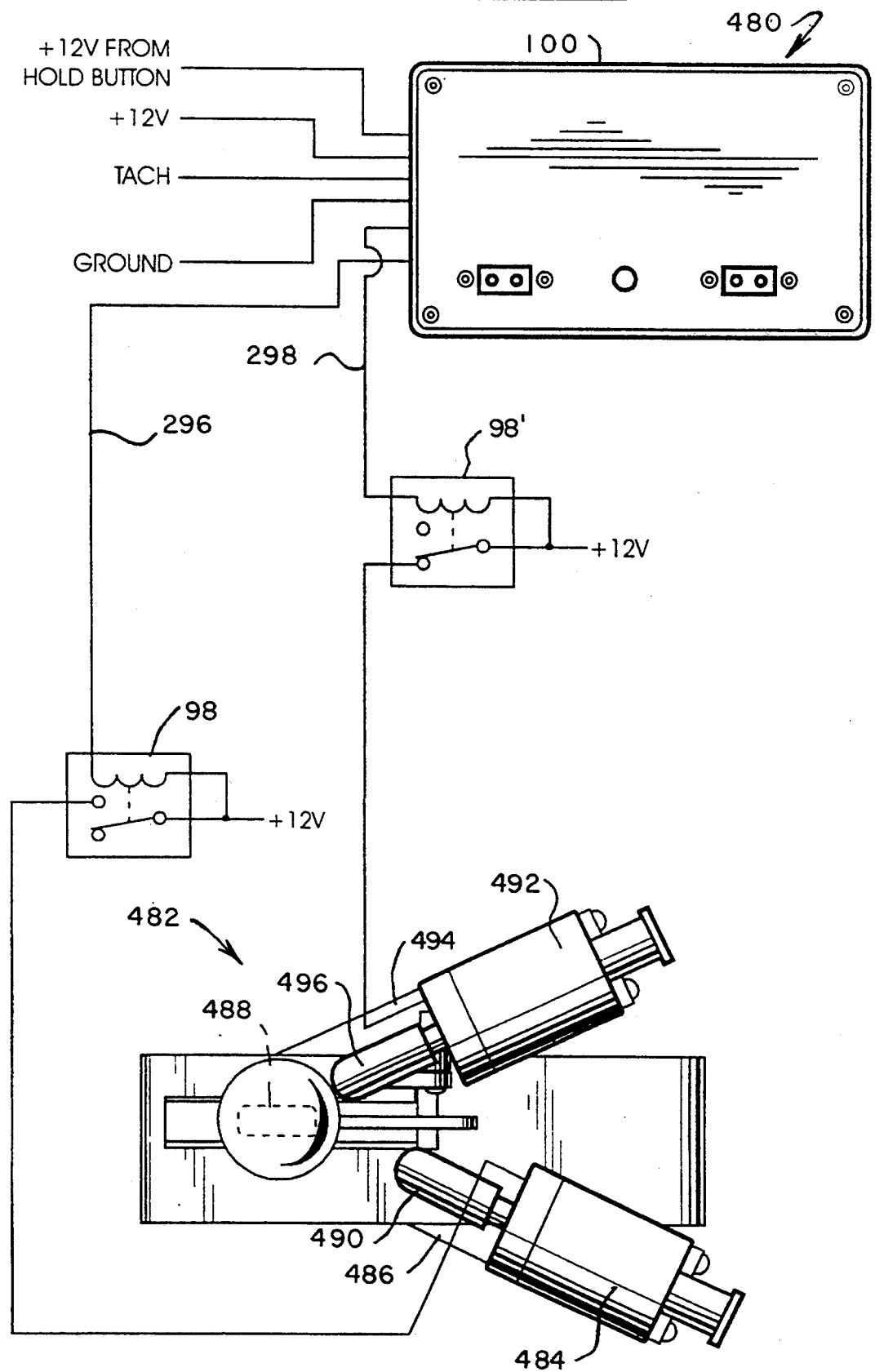
FIG. 16 is a diagram of a system for controlling a three speed transmission with an in line reverse pattern shifter and two solenoids.

Shown in FIG. 16 is wiring diagram 480 for a solenoid controlled three speed in-line shifter with a reverse shifting valve body transmission. Solenoid 484 is mounted to shifter 482 by bracket 486. Shifter handle 488 is pushed rearward by tip 490 of solenoid 484 to second gear aligning it with solenoid 492. Solenoid 492 is mounted to the shifter by bracket 494. Shifter handle 488 is pushed rearward by tip 496 of solenoid 492 to third or high gear. The control of these solenoids are the same as in FIG. 12.

Figure 17:
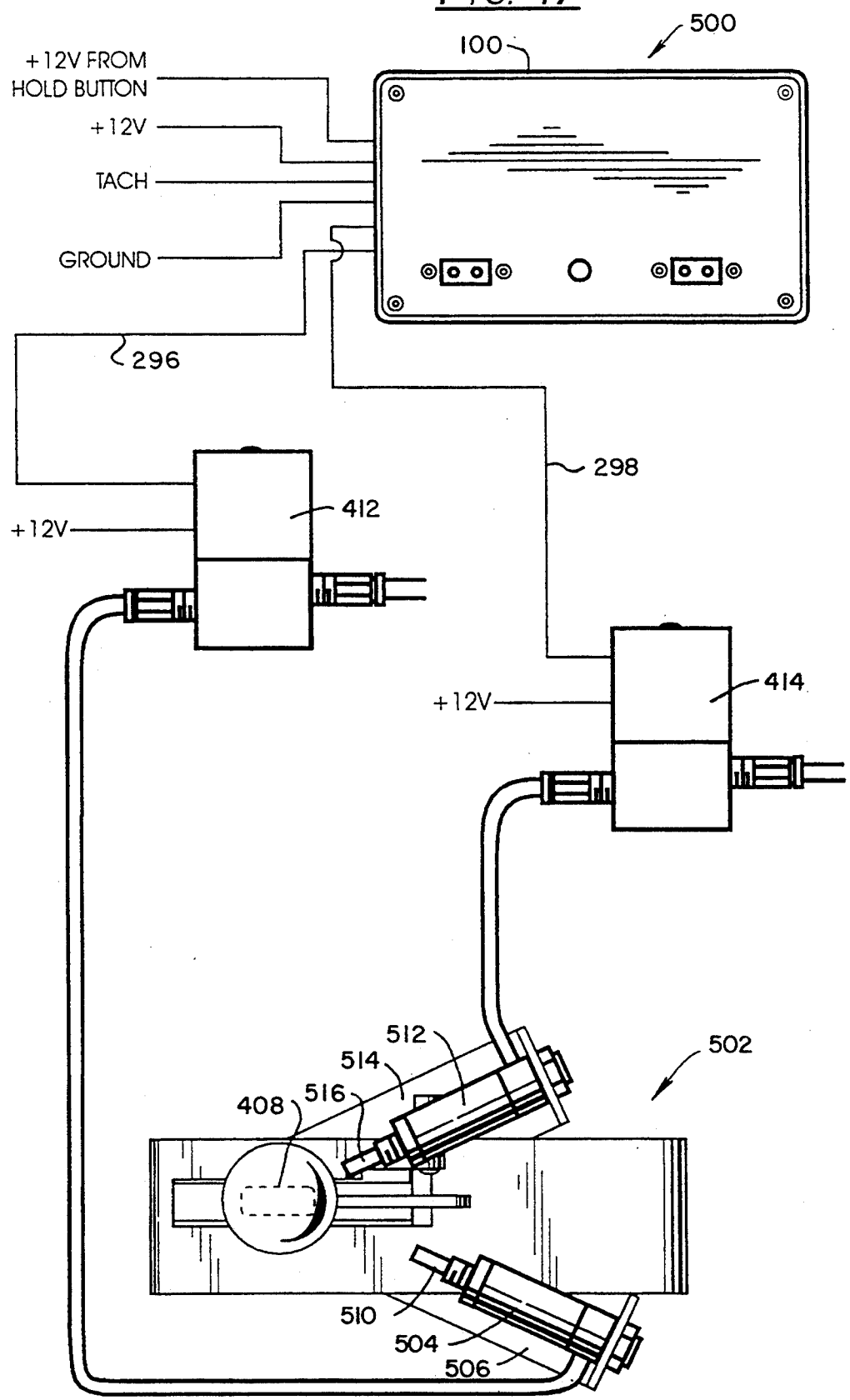
FIG. 17 is a diagram of a system for controlling a three speed transmission with a in line reverse pattern shifter and two pneumatic cylinders.

Shown in FIG. 17 is wiring diagram 500 connected to a pneumatic controlled in-line three speed reverse shifting shifter. Pneumatic cylinder 504 is mounted to shifter 502 by bracket 506. Shifter handle 508 is pushed rearward by piston rod 510 of cylinder 504 to second gear aligning it with cylinder 512. Cylinder 512 is mounted to shifter 502 by bracket 514. Shifter handle 508 is pushed rearward by piston rod 516 of cylinder 512 to third or high gear. The control of these cylinders are the same as in FIG. 13.

Figure 18:
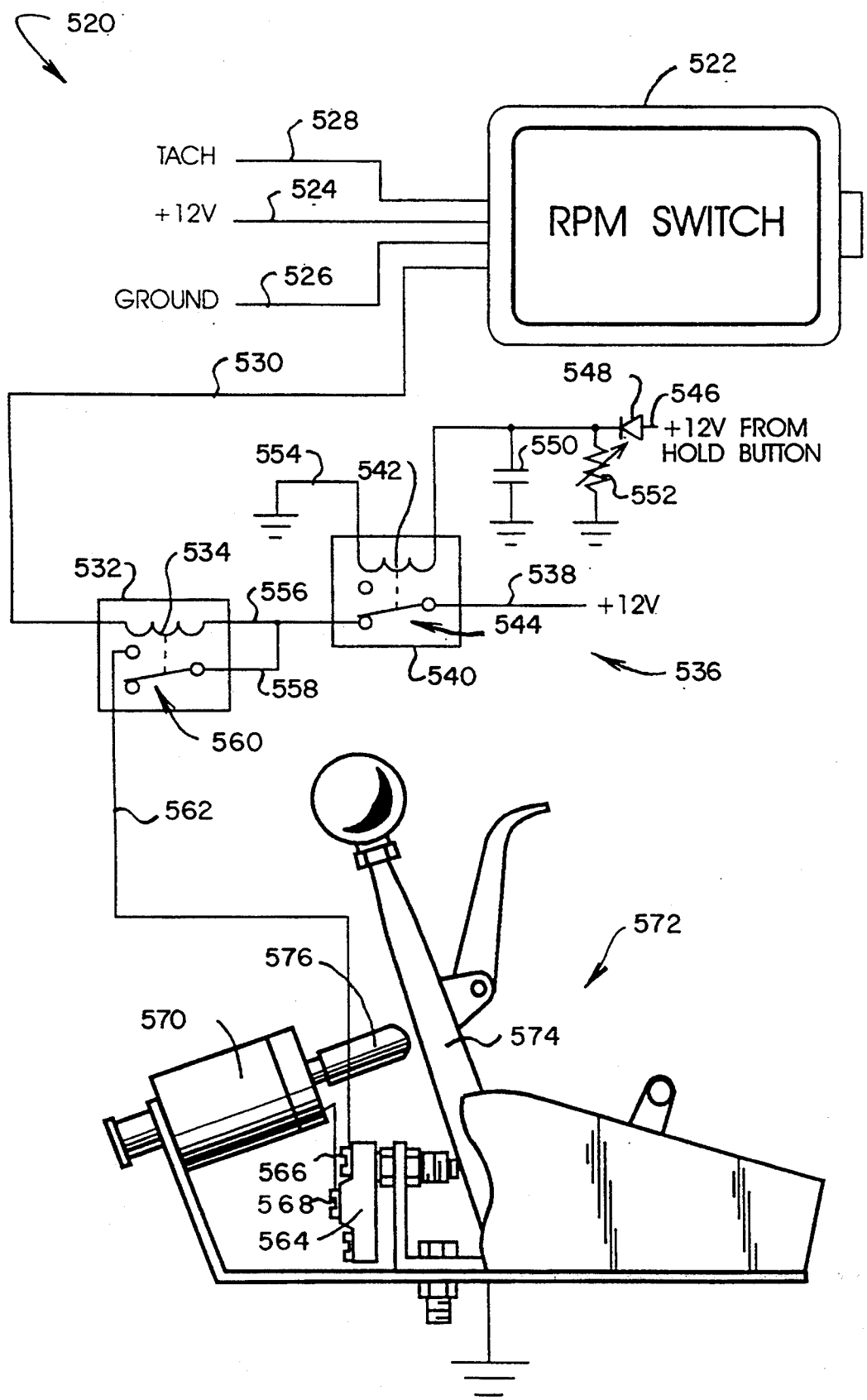
FIG. 18 is a diagram of a mechanical switch system for controlling a two speed transmission with an in line forward pattern shifter and solenoid.

An alternative embodiment is shown in FIG. 18 as mechanical switch or analog wiring diagram 520 connected to a solenoid controlled in-line two speed forward shifting shifter. RPM switch 522 is connected to interface relay 532 by line 530. The rpm switch receives its power through line 524 and is grounded through line 526. A pulse signal is sensed on line 524 of rpm switch 522 controlling interface relay inductor or coil 534 of relay 532. +12 V is supplied on line 538 to time delay relay circuit 536. Inductor or coil 542 of relay 540 is controlled by ground 544 and +12 V on line 546 from the hold button on the vehicles steering wheel. Points 544 of relay 540 are held open for as long as there is voltage on line 546. When the hold button is released by the driver, the voltage is maintained on line 546 by capacitor 550 and diode 548 for a preset time through variable resister 552. Points 544 of relay 540 close applying voltage to line 556 and 558 when the voltage drops off line 546. The voltage on line 556 supplies coil 534 of interface relay 532 and voltage on line 558 supplies points 560 of interface relay 532. Points 560 are closed when coil 534 is activated. Solenoid 570 is activated through line 562 when the points 560 of relay 532 close. Solenoid 570 pushes handle 574 of shifter 572 forward with its tip 576. Shifter handle 574 forward movement opens terminals 566 and 568 of switch 564 disabling the solenoid. Diagram 520 is represented by the flow diagram shown in FIG. 6 for a two speed transmission.

Figure 19:
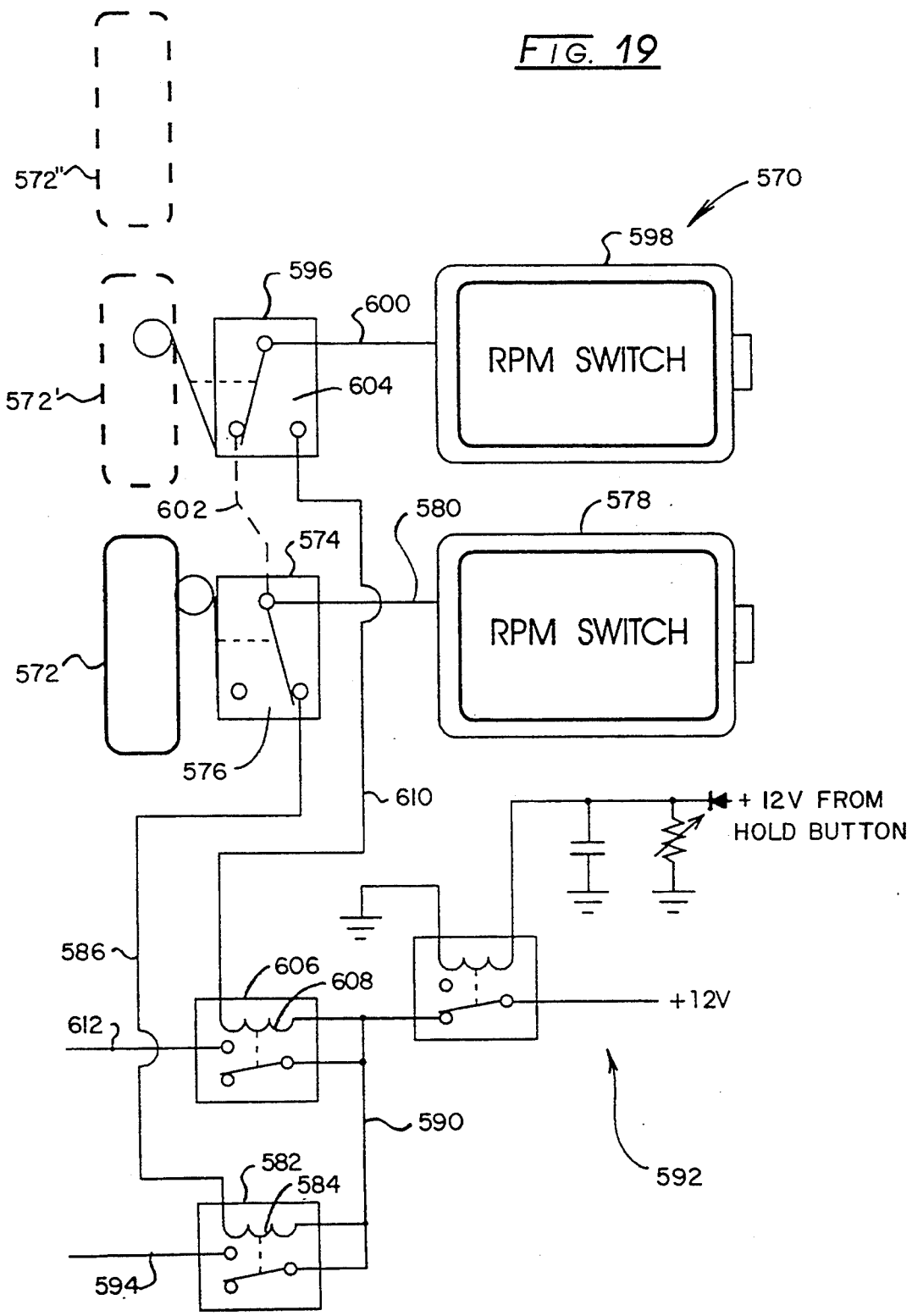
FIG. 19 is an electrical diagram of a mechanical switch system with rpm switches for controlling a two or three speed transmission with an in line forward or reverse pattern shifter and one or two solenoids or one or two pneumatic cylinders.

A second alternative embodiment is shown in FIG. 19 as mechanical switch or analog diagram 570 for an in-line shifter for a forward or reverse valve body transmission. When shifter handle 572 is in the first gear position, switch 574 is made closing its points 576. RPM switch 578 is connected through line 580 to switch 574. When points 576 are closed, coil 584 of relay 582 is activated through line 586. The voltage is supplied to relay through line 590 from time delay relay circuit 592, which circuit is the same as used in FIG. 18. When relay 582 is activated, a voltage is supplied through line 594 to shifter controller shifting the handle 572 to second gear position 572'. RPM switch 598 is connected through line 600 to switch 596. This switch also can be connected to switch 574 if jumper 602 is installed. The jumper is needed if only one rpm switch 598 used. When shifter handle 574 is pushed into second gear position 572', switch 574 opens and switch 596 is made closing points 604. When points 604 are closed, coil 608 of relay 606 is activated through line 610. The voltage is supplied to relay 606 through line 590. When relay 606 is activated, a voltage is supplied through line 612 to a second shifter controller shifting handle 572 to third or high gear position 572''. Switch 596 opens when shifter handle 572 is pushed into high gear position 572'', disabling the system. Diagram 570 is represented in the flow diagram of FIG. 6 for a two or three speed transmission. This is achieved by using only one switch with a two speed transmission and both switches with a three speed transmission.

The description herein relates specifically to a two or three speed transmission control. However, it is to be understood that any number of gears could be activated by a shifter, ratchet or in-line, through additional circuitry or switches and that the rpm levels could be set independently for each gear change, that the rpm levels are changed through a module that is either fixed or adjustable, that the gear changes can be made by one rpm switch set at one level, and that the rpm switches can be internal or external for this system. The inventive system further can be controlled by a microprocessor circuit which can be programmed through the use of the flow diagram in FIG. 6.

I claim:
1. In a multi-geared vehicle equipped with an in-line shifter having a front, a rear, an upstanding shift handle, and a cover which is attached to the vehicle by a housing attachment and which shifts the vehicle forward gears in a forward or reverse pattern with a shifter assembly, the improved shifter assembly which comprises:
   (a) a bracket mounted to an in-line shifter and attached to the vehicle by rise housing attachment while said cover is in position; and
   (b) an actuatable rod and piston assembly attached to the bracket and to the shift handle of the in-line shifter with shifter handle arc accommodation.

2. The improved shifter assembly of claim 1, wherein said shifter handle arc accomodation comprises a clevis pin disposed in an enlarged hole in the shift handle for attaching said piston to said shift handle.

3. The improved shifter assembly of claim 1, wherein said shifter handle arc accomodation comprises said rod and piston assembly being pivotally attached to said bracket.

4. The improved shifter assembly of claim 1, wherein the top horizontal portion of said bracket is vertically adjustably attached to the upstanding portion of said bracket.

5. The improved shifter assembly of claim 1, wherein said rod and piston assembly comprises an electrically actuatable solenoid.

6. The improved shifter assembly of claim 1, wherein said rod and piston assembly is pneumatically actuatable.

7. The improved shifter assembly of claim 1, wherein a vertically disposed bracket part is vertically adjustably attached to said bracket, and said rod and piston assembly is attached thereto.

8. The improved shifter assembly of claim 7, wherein said rod and piston assembly comprises an electrically actuatable solenoid.

9. The improved shifter assembly of claim 6, wherein a horizontally disposed bracket part extending away from said shifter handle is vertically adjustably attached to said bracket and said pneumatially actuatable rod and piston assembly is pivotally attached thereto.

10. The improved shifter of claim 1, wherein said bracket is a C-bracket.

11. The improved shifter of claim 1, wherein said bracket is mounted to the rear of said in-line shifter.

12. The improved shifter of claim 1, wherein said bracket is mounted to the front of said in-line shifter.

* * * * *

UNITED STATES PATENT AND TRADEMARK OFFICE
CERTIFICATE OF CORRECTION

PATENT NO. : 5,448,925
DATED : September 12, 1995
INVENTOR(S) : Patrick A. McFadden It is certified that error appears in the above-indentified patent and that said Letters Patent is hereby corrected as shown below:

Col. 3, line 24, change "Pans 32" to --Parts 32--;

line 28, change "upper pan 32" to --upper part 32--.

Col. 10, claim 1, line 20, change "by rise housing" to --by the housing--

Signed and Sealed this

Twenty-sixth Day of March, 1996

Attest:

BRUCE LEHMAN

*Attesting Officer*       *Commissioner of Patents and Trademarks*